United States Patent [19]
Windsor

[11] 3,779,245
[45] Dec. 18, 1973

[54] DEVICE FOR APPLYING MATERIALS TO THE AREA OF THE EYE

[76] Inventor: Robert K. Windsor, 417 Spruce St., Philadelphia, Pa. 19106

[22] Filed: June 13, 1972

[21] Appl. No.: 262,384

[52] U.S. Cl. ............................................... 128/233
[51] Int. Cl. ............................................ A61m 1/00
[58] Field of Search................... 128/233, 173, 249

[56] References Cited
UNITED STATES PATENTS

| | | | |
|---|---|---|---|
| 2,382,771 | 8/1945 | Bowers | 128/233 |
| 2,736,316 | 2/1956 | Stovall | 128/233 |
| 3,640,274 | 2/1972 | Costello | 128/173 |
| 3,506,001 | 4/1970 | Costello | 128/173 |

Primary Examiner—Richard A. Gaudet
Assistant Examiner—J. Yasko
Attorney—Arthur H. Seidel et al.

[57] ABSTRACT

A device to be used for applying materials to the area of the eye which comprises an applying means for applying materials to the area and a mirror so that the user can see his eye reflected therein during the applying process.

3 Claims, 8 Drawing Figures

PATENTED DEC 18 1973
3,779,245
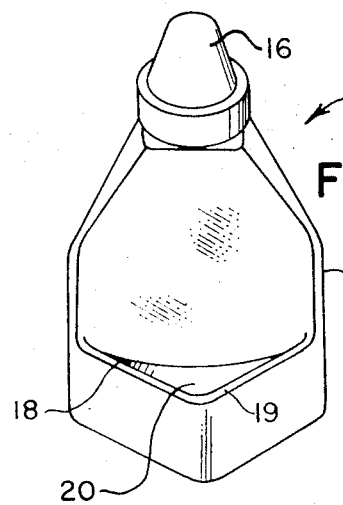
FIG. 1
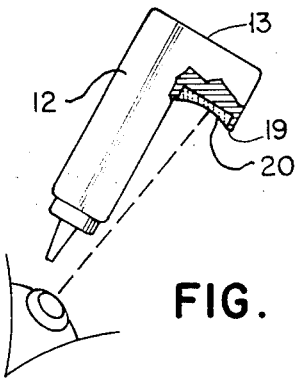
FIG. 4
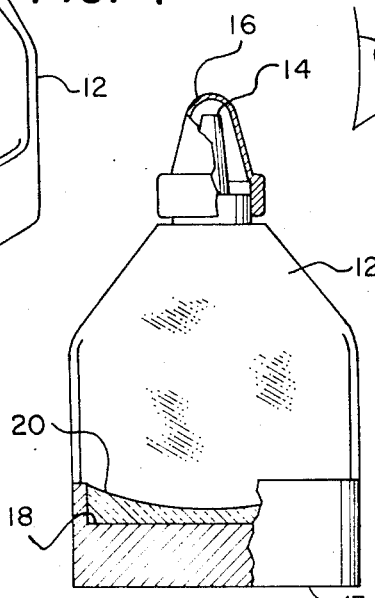
FIG. 2
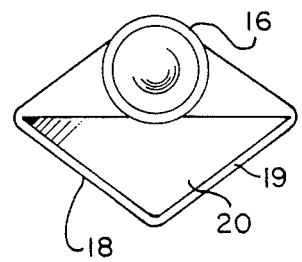
FIG. 3
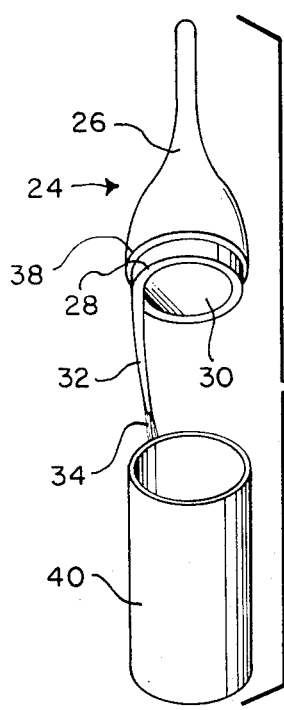
FIG. 5
FIG. 6
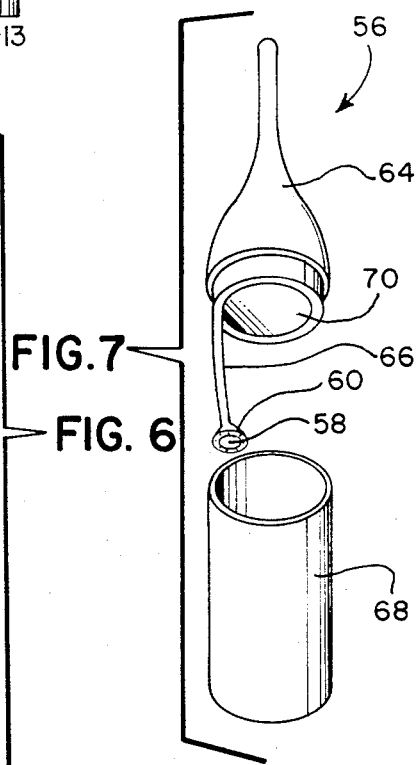
FIG. 7
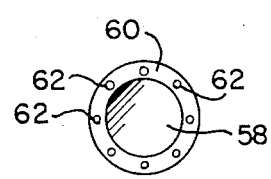
FIG. 8

1

DEVICE FOR APPLYING MATERIALS TO THE AREA OF THE EYE

This invention relates to an applying device and more particularly to a device for applying the materials to the area of the eye.

Many people have a substantial amount of difficulty in applying materials to the eye or to the region of the eye. These persons find it very difficult to apply drops to their eyes or to remove or place contact lenses therein. This is because the eye has a natural tendency to blink or close as a foreign object approaches. A similar problem is encountered in the application of cosmetics such as eye liner, mascara and the like.

It is believed that the eye finds the approach of objects to be offensive because of its inability to focus on them.

The disadvantages outlined above have been overcome by the present invention. Thus, the present invention relates to a device to be used for applying materials to the area of the eye which comprises applying means, and a mirror supported by the device in spaced relation from the applying means and in generally facing relation thereto. When applying materials to the eye or the area surrounding the eye, the user merely focuses on his own eye as reflected in the mirror. This obviates all desire for blinking or closing the eye so that the material can be applied as desired.

The invention can best be described by referring to the drawing and following specification where a number of embodiments thereof are illustrated. However, it should be understood that these embodiments are merely exemplary and the invention should not be limited thereby.

In the drawings,

FIG. 1 is a perspective view of an eye dropper constructed in accordance with one form of the invention.

FIG. 2 is a side elevation view of the eye dropper illustrated in FIG. 1 with portions thereof broken away to show its construction.

FIG. 3 is a plan view of the eye dropper illustrated in FIG. 1.

FIG. 4 is a schematic drawing of the eye dropper illustrated in FIG. 1 as used.

FIG. 5 is a perspective view of another embodiment of the invention.

FIG. 6 is a perspective view of a further embodiment of the invention.

FIG. 7 is a perspective view of still another embodiment of the invention.

FIG. 8 is a plan view of a portion of the device shown in FIG. 7.

Now referring to the drawing for a detailed description of the invention, an applying device 10 is illustrated in FIG. 1. In this embodiment of the invention, the applying device may be an eye dropper or other container which comprises a resilient peripheral side wall 12 and an end wall 13. The outer surface of the wall 12 functions as a gripping surface. The container is closed at its lower end and has an outlet 14 at its upper end which is capable of dispensing material in drop form. The outlet 14 may be closed by a suitable cap 16 when the container is not being used.

As best seen in FIGS. 1 and 2, a laterally extending ledge 18 or other suitable supporting surface having an outer edge 19 which is substantially coextensive with the end wall 13 may be formed in the side wall of the container intermediate end wall 13 and opening 14. A portion of the peripheral side wall extends between the outer edge and the end wall 13. The ledge supports a mirror 20 which has its reflective surface turned in generally facing relation to the outlet 14. Preferably, the ledge is in spaced relation from the outlet 14 and the mirror is concave so that focusing is achieved when the eye is close to the outlet 14. This assures that drops which are dispensed from the container will fall directly into the eye.

In FIG. 5, a device for applying a cosmetic to the area of the eye 24 is illustrated. It comprises a handle 26 having a surface 28 which defines a support for a mirror 30. An elongated member 32 is supported at one end by surface 28 adjacent the periphery of mirror 30. At its free end, it supports a suitable cosmetic applying device 34. In the embodiment shown, the applying device is a brush. A step 38 is formed in the periphery of the handle 26 so that the handle may be received in a hollow cosmetic container 40. Thus, when assembled, the elongated member 32 and the cosmetic applying device 34 are in the container and protected from damage.

The mirror 30 may be planar. However, it is preferred that it be concave and have a focus such that the eye will be in focus when the brush is touching the eye.

In the embodiment of the invention illustrated in FIG. 6, the applying device 44 is virtually identical to the embodiment illustrated in FIG. 5. However, this embodiment is particularly usable for applying and removing contact lenses since it has a suction cup 46 at the end of elongated member 48.

In this regard, the mirror 50 is preferably concave and the container 52 has suitable means therein for supporting the contact lenses when not in use.

As is well known, sufficient adherence of a contact lens to cup 46 will be achieved by merely moistening the cup.

The applying device 56 shown in FIG. 7 is similar to that shown in FIG. 6. However, in this embodiment, the suction cup 58 is surrounded by an annulus 60 having a plurality of apertures 62 therein (FIG. 8). In this embodiment, a reservoir is formed on the interior of handle 64 and its walls are made of a resilient material. The elongated member 66 which is hollow forms a conduit connecting the reservoir within handle 64 to the annulus 60. Container 68 may be used to store contact lenses in a manner similar to that described in connection with the embodiment of FIG. 6. Thus, with the device shown in FIG. 7, medication can be dropped into the eye after the contact lens has been removed. Then, the lens can be replaced thereafter. It can be done in a simple operation with the mirror 70 obviating the tendency of the eye to blink. As explained above, the mirror 70 may be planar. However, it is preferred that it be concave with its focus located a sufficient distance away from its surface to permit proper positioning of the suction cup 58 and annulus 56.

While the invention has been described with reference to a number of embodiments thereof, it is apparent that many other forms and embodiments be obvious to those skilled in the art in view of the foregoing description. Thus, the scope of the invention should not be limited by that description but rather, only by the scope of the claims appended hereto.

I claim:

1. A device to be used for applying materials to the eye comprising, a container, said container comprising means defining side walls and an end wall, said side walls defining an opening at the end of said container remote from said end wall for dispensing the material, a laterally extending ledge formed by said walls, said ledge being disposed intermediate said end wall and said opening, said ledge having an outer edge, said end wall being substantially coextensive with said outer edge and a portion of said walls extends therebetween, a mirror supported on said ledge in generally facing relation to said opening, said mirror being concave, and the concavity of said mirror cooperating with the distance between said mirror and said opening so that when the eye is focused in the mirror, the material will enter it when dispensed from said container.

2. A device as defined in claim 1 wherein said walls comprise outer surfaces, and said outer surfaces define means for gripping said container.

3. A device as defined in claim 1 wherein said walls are resilient.

* * * * *